United States Patent
Nobukuni et al.

(10) Patent No.: US 11,414,514 B2
(45) Date of Patent: Aug. 16, 2022

(54) POLYETHER POLYOL PRODUCTION METHOD AND POLYURETHANE FOAM PRODUCTION METHOD

(71) Applicant: SANYO CHEMICAL INDUSTRIES, LTD., Kyoto (JP)

(72) Inventors: Erika Nobukuni, Kyoto (JP); Takashi Yabuta, Kyoto (JP)

(73) Assignee: SANYO CHEMICAL INDUSTRIES, LTD., Kyoto (JP)

( * ) Notice: Subject to any disclaimer, the term of this patent is extended or adjusted under 35 U.S.C. 154(b) by 491 days.

(21) Appl. No.: 16/470,306

(22) PCT Filed: Dec. 28, 2017

(86) PCT No.: PCT/JP2017/047149
§ 371 (c)(1),
(2) Date: Jun. 17, 2019

(87) PCT Pub. No.: WO2018/128155
PCT Pub. Date: Jul. 12, 2018

(65) Prior Publication Data
US 2019/0309120 A1 Oct. 10, 2019

(30) Foreign Application Priority Data

Jan. 6, 2017 (JP) .................................. 2017-000816
Mar. 23, 2017 (JP) ............................. JP2017-057308

(51) Int. Cl.
*C08G 18/48* (2006.01)
*C08G 65/26* (2006.01)
*C08G 65/30* (2006.01)

(52) U.S. Cl.
CPC ............ *C08G 18/48* (2013.01); *C08G 65/26* (2013.01); *C08G 65/2678* (2013.01); *C08G 65/2687* (2013.01); *C08G 65/2693* (2013.01); *C08G 65/30* (2013.01)

(58) Field of Classification Search
CPC ................ C08G 18/1833; C08G 18/48; C08G 18/4816; C08G 18/4837; C08G 18/7621; C08G 18/7664; C08G 65/26; C08G 65/2678; C08G 65/2687; C08G 65/2693; C08G 65/30; C08G 2110/0083
See application file for complete search history.

(56) References Cited

U.S. PATENT DOCUMENTS

| | | | | |
|---|---|---|---|---|
| 3,715,402 A | * | 2/1973 | Louvar et al. | C08G 65/30 536/120 |
| 5,468,839 A | * | 11/1995 | Suppes | C08G 65/30 528/403 |
| 2013/0338331 A1 | * | 12/2013 | Lorenz | C08G 18/4845 568/619 |
| 2017/0081491 A1 | * | 3/2017 | Chen | C08G 18/1816 |

FOREIGN PATENT DOCUMENTS

| | | |
|---|---|---|
| CN | 1229806 | 9/1999 |
| CN | 1357019 | 7/2002 |
| CN | 104177608 | 12/2014 |
| CN | 104262611 | 1/2015 |
| JP | 56-104936 | 8/1981 |
| JP | 2002-506898 | 3/2002 |
| JP | 2005-124743 | 5/2005 |
| JP | 2005-306947 | 11/2005 |
| JP | 2006-182825 | 7/2006 |
| JP | 2007-284585 | * 11/2007 |
| JP | 2009-263475 | 11/2009 |
| JP | 2012-072260 | 4/2012 |
| JP | 2014-129519 | 7/2014 |
| JP | 2015-172181 | 10/2015 |
| JP | 2015-193826 | 11/2015 |
| JP | 2017-171708 | 9/2017 |
| WO | 99/47582 | 9/1999 |

OTHER PUBLICATIONS

International Search Report dated Mar. 20, 2018 in International (PCT) Application No. PCT/JP2017/047149.
Office Action dated Apr. 19, 2021 in corresponding Chinese Patent Application No. 201780081441.0, with English Translation.
"Solid Acids and Bases Their Catalytic Properties", Tian Bu Hao San, Chemical Industry Press, pp. 1-2, 1979, cited in CA.
"Advanced Inorganic Chemistry", Yueh Hong et al., Mechanical Industry Press, pp. 147-148, 2002, cited in CA.

* cited by examiner

*Primary Examiner* — John M Cooney
(74) *Attorney, Agent, or Firm* — Wenderoth, Lind & Ponack, L.L.P.

(57) ABSTRACT

The present invention aims to provide a method of producing a polyether polyol having a low aldehyde content, the method including simpler steps; and a method of producing polyurethane foam having a reduced amount of aldehyde volatilization. The present invention provides a method of producing a polyether polyol (F) including step (1) of obtaining a crude polyether polyol composition (D2) having a pH higher than 5.0 by contact of a crude polyether polyol composition (D1) containing a polyether polyol (A) with an acid catalyst (B) in the presence of water, the polyether polyol (A) being obtainable by ring-opening polymerization of an alkylene oxide with an active hydrogen compound; and step (2) of removing a volatile component containing an aldehyde (C) after step (1).

14 Claims, No Drawings

POLYETHER POLYOL PRODUCTION METHOD AND POLYURETHANE FOAM PRODUCTION METHOD

TECHNICAL FIELD

The present invention relates to a method of producing a polyether polyol having a low aldehyde content and a method of producing polyurethane foam.

BACKGROUND ART

Along with the recent increase in concerns about environmental problems, minimization of volatilization of aldehydes such as formaldehyde (volatile organic compounds) has been demanded not only in the housing field but also in compartments of vehicles such as automobiles. Thus, minimization of the aldehyde content in automotive interior materials is desired.

For example, in the case of vehicle seat pads containing high cushioning soft urethane foam, a compound such as formaldehyde or acetaldehyde, which is contained in a raw material of polyurethane foam or which is generated during urethane-forming reaction, is diffused from the pads after formation of the urethane foam. Thus, a reduction in generation of these aldehydes is required.

One conventionally known method is a method of mixing a hydrazine compound capable of degrading aldehydes with a polyol compound (see Patent Literature 1).

Another known method is a method of applying an aldehyde capturing agent to a surface of a seat pad so as to prevent volatilization of aldehydes (see Patent Literature 2).

Still another known method is a method of recovering substantially odorless polyether polyol by contact of a polyether polyol product with excess acid having a pKa of less than 5 under hydrolysis conditions and contacting a reaction mixture with water under hydrolysis conditions (Patent Literature 3). Yet, this production method fails to sufficiently reduce aldehydes, and this production method requires a step of neutralizing the acid, adsorbing the resulting salt, and recovering the salt by filtration.

CITATION LIST

Patent Literature

Patent Literature 1: JP 2006-182825 A
Patent Literature 2: JP 2005-124743 A
Patent Literature 3: JP 2002-506898 T

SUMMARY OF INVENTION

Technical Problem

Thus, while a polyether polyol is a main raw material of polyurethane foam, the present invention aims to provide a method of producing a polyether polyol having a low aldehyde content, the method including simpler steps; and a method of producing polyurethane foam having a reduced amount of aldehyde volatilization.

Solution to Problem

As a result of extensive studies, the present inventors arrived at the present invention.

Specifically, the present invention provides a method of producing a polyether polyol (F), including step (1) of obtaining a crude polyether polyol composition (D2) having a pH higher than 5.0 by contact of a crude polyether polyol composition (D1) containing a polyether polyol (A) with an acid catalyst (B) in the presence of water, the polyether polyol (A) being obtainable by ring-opening polymerization of an alkylene oxide with an active hydrogen compound; and step (2) of removing a volatile component containing an aldehyde (C) after step (1). The present invention also provides a method of producing polyurethane foam (G), including reacting the polyether polyol (F) obtained by the method of producing a polyether polyol of the present invention with a polyisocyanate (E), the polyether polyol (F) and the polyisocyanate (E) being essential materials.

Advantageous Effects of Invention

The polyether polyol of the present invention can produce a polyether having a low aldehyde content, and the production method has simpler steps.

Polyurethane foam formed from the polyether polyol can have a reduced amount of aldehyde volatilization.

DESCRIPTION OF EMBODIMENTS

The present invention provides a method of producing a polyether polyol (F) including step (1) of obtaining a crude polyether polyol composition (D2) having a pH higher than 5.0 by contact of a crude polyether polyol composition (D1) containing a polyether polyol (A) with an acid catalyst (B) in the presence of water, the polyether polyol (A) being obtainable by ring-opening polymerization of an alkylene oxide with an active hydrogen compound; and step (2) of removing a volatile component containing an aldehyde (C) after step (1).

The steps (1) and (2) are specifically described below.

In the method of producing the polyether polyol (F) of the present invention, the crude polyether polyol composition (D1) obtained by the following steps (i) and (ii) can be used.

Step (i): This is a step of obtaining a crude polyether polyol composition containing an aldehyde (C) as an impurity and a polyether polyol (A) obtained by ring-opening polymerization of an alkylene oxide with an active hydrogen compound. The ring-opening polymerization may be performed in the presence or absence of a reaction catalyst (e.g., an alkaline or Lewis acid catalyst).

Step (ii): In the case where the crude polyether polyol composition is obtained in the presence of an alkaline catalyst in step (i), this is a step of obtaining the crude polyether polyol composition (D1) by removing the alkaline catalyst in a crude polyether polyol composition (D0) containing the alkaline catalyst, through adsorption with a treatment agent.

The crude polyether polyol (D1) can be obtained in step (i) without the need of performing step (ii) in the case where an alkylene oxide was ring-opening polymerized with an active hydrogen compound in the presence of a Lewis acid catalyst or in the case where no catalyst was used in step (i).

The method of producing the polyether polyol (F) of the present invention includes the following steps.

Step (1): a step of obtaining a crude polyether polyol composition (D2) having a pH higher than 5.0 by contact of the crude polyether polyol composition (D1) obtained above with the acid catalyst (B) in the presence of water Step (2): a step of obtaining the polyether polyol (F) by removing a volatile component containing the aldehyde (C) in the crude polyether polyol composition (D2)

The polyether polyol having a low aldehyde content (F) can be obtained by the above steps.

In step (1), preferably, the acid catalyst (B) is a solid acid catalyst (B1), and the crude polyether polyol composition (D1) is contacted with the solid acid catalyst (B1) by a batch method.

When the crude polyether polyol composition (D1) is contacted with the solid acid catalyst (B1) by the batch method, step (iii) of recovering the solid acid catalyst (B1) by filtration or the like after step (1) is preferably performed.

In step (1), it is also preferred to continuously contact the crude polyether polyol composition (D1) with the immobilized solid acid catalyst (B1) as the acid catalyst (B).

This method is a continuous method.

In the case of such a continuous method or in the case where the acid catalyst (B) is a Lewis acid catalyst (B2), step (iii) of recovering the solid acid catalyst (B1) by filtration or the like is unnecessary.

These steps are combined differently depending on conditions of the catalyst for ring-opening polymerization of an alkylene oxide or conditions of the acid catalyst to be contacted. For example, the steps can be combined as described in (I) to (III) below.

(I) In step (1), in the case where the solid acid catalyst (B1) is used and the crude polyether polyol composition (D1) is contacted with the solid acid catalyst (B1) by the batch method, the order of steps is: (i)→(ii)→(1)→(iii)→(2);

(II) in step (1), in the case where the acid catalyst (B) is the solid acid catalyst (B1) and the crude polyether polyol composition (D1) is contacted with the solid acid catalyst (B1) by the continuous method, or in the case where the acid catalyst (B) is the Lewis acid catalyst (B2), the order of steps is: (i)→(ii)→(1)→(2); and (III) in step (i), in the case where an alkylene oxide was ring-opening polymerized with an active hydrogen compound in the presence of a Lewis acid catalyst or in the case where no catalyst was used, the order of steps is: (i)→(1)→(iii)→(2), or (i)→(1)→(2).

Thus, the production method of the present invention essentially includes step (1) of obtaining the crude polyether polyol composition (D2) having a pH higher than 5.0 by contact of the crude polyether polyol composition (D1) containing the polyether polyol (A) with the acid catalyst (B) in the presence of water, the polyether polyol (A) being obtainable by ring-opening polymerization of an alkylene oxide with an active hydrogen compound; and step (2) of removing a volatile component containing the aldehyde (C) after step (1).

Each step is described below in further detail.

Step (i)

The crude polyether polyol composition (D1) for use in the production method of the present invention contains the aldehyde (C) as an impurity and the polyether polyol (A) obtained by ring-opening polymerization of an alkylene oxide (hereinafter sometimes abbreviated as AO) with an active hydrogen compound in the presence or absence of a catalyst.

Specific examples of the aldehyde (C) include formaldehyde (C1), acetaldehyde (C2), and propionaldehyde (C3).

The ring-opening polymerization may be performed in the presence or absence of a reaction catalyst (e.g., an alkaline or Lewis acid catalyst).

Step (i) is a step of obtaining a crude polyether polyol composition containing the aldehyde (C) as an impurity and the polyether polyol (A) obtained by ring-opening polymerization of an alkylene oxide with an active hydrogen compound.

In the case where the catalyst is Lewis acid or in the case where polymerization is performed in the absence of a catalyst, the crude polyether polyol composition obtained in step (i) may be directly used as the crude polyether polyol composition (D1) for process with the acid catalyst (B) in step (1), without the need of performing the adsorption treatment in step (ii).

In contrast, in the case where the catalyst is an alkaline catalyst, step (i) results in the crude polyether polyol composition (D0) containing the polyether polyol (A) obtained by ring-opening polymerization of an alkylene oxide with an active hydrogen compound in the presence of an alkaline catalyst. The crude polyether polyol composition (D0) contains alkaline catalyst residues and the aldehyde (C) as impurities. The crude polyether polyol composition (D0) is essentially subjected to the adsorption treatment in step (ii).

In view of reaction time, the reaction temperature of ring-opening polymerization of an alkylene oxide is preferably 80° C. to 180° C., more preferably 90° C. to 160° C.

The alkaline catalyst is preferably a hydroxide of an alkali metal (e.g., potassium hydroxide or cesium hydroxide), more preferably potassium hydroxide. In view of viscosity, the amount of the alkaline catalyst is preferably 0.01 to 5.0 wt %, more preferably 0.01 to 1.0 wt %, relative to the resulting crude polyether polyol composition (D0).

The active hydrogen compound is preferably a divalent to octavalent active hydrogen group-containing compound (a). The divalent to octavalent active hydrogen group-containing compound (a) is at least one active hydrogen group-containing compound selected from the group consisting of a polyhydric alcohol (a1), a polyvalent hydroxyl-group-containing compound (a2) other than polyhydric alcohols, an amino group-containing compound (a3), a thiol group-containing compound (a4), a phosphoric acid group-containing compound (a5), and a compound (a6) having two or more active hydrogen groups.

Examples of the polyhydric alcohol (a1) include C2-C20 aliphatic dihydric alcohols, C3-C20 aliphatic trihydric alcohols, and C5-C20 aliphatic tetrahydric to octahydric alcohols.

Examples of the C2-C20 aliphatic dihydric alcohols include straight-chain or branched aliphatic diols (e.g., ethylene glycol, propylene glycol, 1,3- and 1,4-butanediol, 1,6-hexanediol, and neopentyl glycol), and alicyclic diols (e.g., cyclohexane diol and cyclohexanedimethanol).

Examples of the C3-C20 trihydric alcohols include aliphatic triols (e.g., glycerol and trimethylolpropane).

Examples of the C5-C20 tetra- to octahydric alcohols include aliphatic polyols (e.g., pentaerythritol, sorbitol, mannitol, sorbitan, diglycerol, and dipentaerythritol) and sugars (e.g., sucrose, glucose, mannose, fructose, methylglucoside, and derivatives thereof).

Preferred among these are C2-C10 aliphatic dihydric to octahydric alcohols, and more preferred are aliphatic dihydric to tetrahydric alcohols.

Examples of the polyvalent hydroxyl-group-containing compound (a2) other than polyhydric alcohols include polyphenols. Specific examples include polyphenols such as hydroquinone, bisphenol A, bisphenol F, bisphenol S, 1,3,6,8-tetrahydroxynaphthalene, anthrol, 1,4,5,8-tetrahydroxyanthracene, and 1-hydroxypyrene; polybutadiene polyol; castor oil-based polyols; polyfunctional (e.g., the number of polyfunctional groups: 2 to 100) polyols such as polyvinyl alcohol and (co)polymers of hydroxyalkyl (meth)acrylate;

condensates of phenol and formaldehyde (novolak); and polyphenols described in U.S. Pat. No. 3,265,641.

The "(meth)acrylate" means methacrylate and/or acrylate. The same shall apply hereinafter.

Examples of the amino group-containing compound (a3) include amines. Specific examples include ammonia; monoamine such as C1-C20 alkylamines (e.g., butylamine) and aniline; straight-chain or branched aliphatic polyamines such as ethylenediamine, hexamethylenediamine, and diethylenetriamine; heterocyclic polyamines such as piperazine and N-aminoethylpiperazine; alicyclic polyamines such as dicyclohexylmethane diamine and isophorone diamine; aromatic polyamines such as phenylenediamine, tolylenediamine, and diphenylmethanediamine; polyamide polyamine obtainable by condensation of a dicarboxylic acid with excess polyamine; polyether polyamines; hydrazines (e.g., hydrazine and monoalkylhydrazine), dihydrazides (e.g., succinic acid dihydrazide and terephthalic acid dihydrazide), and guanidines (e.g., butylguanidine and 1-cyanoguanidine).

Examples of the thiol group-containing compound (a4) include a polythiol compound. Examples of the polythiol include polyvalent (divalent to octavalent) thiols. Specific examples include ethanedithiol and 1,6-hexanedithiol.

Examples of the phosphoric acid group-containing compound (a5) include phosphoric acid, phosphorus acid, and phosphonic acid.

Examples of the compound (a6) having two or more active hydrogen groups include compounds containing two or more active hydrogen groups (e.g., hydroxyl, amino, carboxyl, thiol, and phosphoric acid groups) in the molecule, such as alkanolamines (e.g., monoethanolamine and diethanolamine), amino acids (e.g., aspartic acid), and hydroxycarboxylic acids (e.g., citric acid).

Among these, the active hydrogen group-containing compound (a) is preferably a polyhydric alcohol, an amino group-containing compound, or a compound having two or more active hydrogen groups, more preferably a polyhydric alcohol, particularly preferably ethylene glycol, propylene glycol, glycerol, or pentaerythritol.

Examples of AOs to be added to the active hydrogen group-containing compound (a) include C2-C6 AOs such as ethylene oxide (hereinafter sometimes abbreviated as EO), 1,2-propylene oxide (hereinafter sometimes abbreviated as PO), 1,3-propylene oxide, 1,2-butylene oxide, and 1,4-butylene oxide. Preferred among these in view of properties and reactivity are PO, EO, and 1,2-butylene oxide. In the case where two or more of these AOs are used in combination (e.g., PO and EO), these AOs may be added by block addition, random addition, or a combination thereof.

An AO adduct of the active hydrogen group-containing compound (a), which is obtained by adding an AO to the active hydrogen group-containing compound (a), may also be used as an active hydrogen compound.

Preferred examples of such an active hydrogen compound include polyhydric alcohol-AO adducts and amino group-containing compound-AO adducts. More preferred examples include a propylene glycol-PO adduct, a glycerol-PO adduct, glycerol-PO.EO adduct, and a pentaerythritol-PO adduct.

The polyether polyol (A) may also be a polyether polyol obtainable by further ring-opening polymerization of an alkylene oxide with an AO adduct of the active hydrogen group-containing compound (a) as an active hydrogen compound.

Preferred examples of the polyether polyol (A) include polyhydric alcohol-AO adducts and amino group-containing compound-AO adducts. More preferred examples include a propylene glycol-PO adduct, a glycerol-PO adduct, a glycerol-PO'EO adduct, and a pentaerythritol-PO adduct.

In view of handling and viscosity, the hydroxyl value (mg KOH/g) of the polyether polyol (A) is preferably 10 to 150, more preferably 20 to 70.

In the present invention, examples of the aldehyde (C) present as an impurity in the crude polyether polyol composition (D0) and the crude polyether polyol composition (D1) include formaldehyde (C1), acetaldehyde (C2), and propionaldehyde (C3).

The formaldehyde (C1), the acetaldehyde (C2), and the propionaldehyde (C3) can be analyzed by a method in which a sample is converted to a 2,4-dinitrophenylhydrazine derivative and the derivative is measured by HPLC. This analysis method can measure the total amount of free aldehyde contained in the polyether polyol composition and a substance that may be later converted to a free aldehyde due to degradation or the like.

Step (ii)

In the case where a crude polyether polyol composition is obtained using an alkaline catalyst in step (i), a treatment agent for use in the adsorption treatment of the alkaline catalyst in the crude polyether polyol composition (D0) is preferably magnesium silicate or aluminum silicate (an example of magnesium silicate is Kyowado (registered trademark) 600 available from Kyowa Chemical Industry Co., Ltd.). Magnesium silicate and aluminum silicate may be used individually or in combination.

In view of the amount of alkali adsorption and duration of the step, the amount of the treatment agent is preferably 0.1 to 3.0 wt %, more preferably 0.3 to 2.0 wt %, based on the weight of the crude polyether polyol composition (D0).

In view of viscosity of the crude polyether polyol composition (D0), the temperature of the alkali adsorption treatment is preferably 60° C. to 110° C., more preferably 70° C. to 100° C., most preferably 85° C. to 95° C.

The alkali adsorption treatment is repeated until the crude polyether polyol composition (D0) has a CPR of 1 or less. The CPR is a value obtained by multiplying the amount (mL) of a 0.01 mol/L hydrochloric acid aqueous solution required for neutralization of 30 g of a sample by 10.

Any equipment may be used for the alkali adsorption treatment as long as it allows the crude polyether polyol composition (D0) to contact with a treatment agent and can separate the crude polyether polyol composition (D0) from the treatment agent after the contact.

Step (1)

The solid acid catalyst (B1) or the Lewis acid catalyst (B2) can be used as the acid catalyst (B) in step (1) of the present invention.

The solid acid catalyst (B1) has a solubility of 0.1 g or less in 100 g of the polyether polyol (A) at 80° C. The Lewis acid catalyst (B2) has a solubility of more than 0.1 g in 100 g of the polyether polyol (A) at 80° C.

The solid acid catalyst (B1) usable as the acid catalyst (B) in step (1) of the present invention refers to a solid substance including, on its surface, an acidic site that acts as a catalytic active site. The solid acid catalyst (B1) is preferably an inorganic porous body.

Specifically, the solid acid catalyst (B1) is preferably at least one selected from the group consisting of silica, alumina, titania, magnesia, zirconia, zeolite, montmorillonite, aluminum silicate, hydroxyapatite, and mixture thereof. Silica, alumina, and zeolite are more preferred, and silica is particularly preferred. The solid acid catalyst (B1) is also preferably a solid acid catalyst in which an acid (b) is immobilized on the inorganic porous body.

The solid acid catalyst (B1) is more preferably a solid acid catalyst in which a sulfonic acid group-containing compound is immobilized as the acid (b).

The solid acid catalyst (B1) is still more preferably a solid acid catalyst in which a sulfonic acid group-containing compound is immobilized on silica.

The Lewis acid catalyst (B2) usable as the acid catalyst (B) in step (1) of the present invention is an electron pair acceptor.

The Lewis acid catalyst (B2) in the present invention is, for example, at least one compound selected from the group consisting of aluminum halides (e.g., aluminum chloride, aluminum bromide, and aluminum fluoride), boron halides (e.g., boron chloride, boron bromide, and boron fluoride), triphenyl borane, triphenyl aluminum, tris(pentafluorophenyl)borane, and tris(pentafluorophenyl)aluminum.

In view of steric bulkiness and the presence of an acidic site that acts as a catalytic active site, the Lewis acid catalyst (B2) is preferably triphenyl borane, triphenyl aluminum, tris(pentafluorophenyl)borane, or tris(pentafluorophenyl)aluminum, particularly preferably tris(pentafluorophenyl)borane.

In view of reactivity, the amount of the solid acid catalyst (B1) to be contacted with the crude polyether polyol composition (D1) is preferably 0.01 to 5.0 wt %, more preferably 0.1 to 2.5 wt %, based on the weight of the crude polyether polyol composition (D1).

In view of reactivity, the amount of the Lewis acid catalyst (B2) to be contacted with the crude polyether polyol composition (D1) is preferably 30 to 1000 ppm, more preferably 50 to 500 ppm, based on the weight of the crude polyether polyol composition (D1).

In view of reactivity and duration of the step, the temperature for contacting the crude polyether polyol composition (D1) with the solid acid catalyst (B1) is preferably 25° C. to 150° C., more preferably 40° C. to 90° C.

In view of reactivity and duration of the step, the temperature for contacting crude polyether polyol composition (D1) with the Lewis acid catalyst (B2) is preferably 25° C. to 150° C., more preferably 50° C. to 150° C., still more preferably 70° C. to 130° C.

In view of impact on the reactivity and duration of the devolatilization step, the amount of water when contacting the crude polyether polyol composition (D1) with the solid acid catalyst (B1) is preferably 0.05 to 5.0 wt %, more preferably 0.5 to 2.5 wt %, relative to the crude polyether polyol composition (D1).

In view of impact on the reactivity and duration of the devolatilization step, the amount of water when contacting the crude polyether polyol composition (D1) with the Lewis acid catalyst (B2) is preferably 0.05 to 5.0 wt %, more preferably 0.5 to 5.0 wt %, still more preferably 1.0 to 4.0 wt %, relative to the crude polyether polyol composition (D1).

The method of contacting the crude polyether polyol composition (D1) with the solid acid catalyst (B1) in the presence of water may be a continuous method or the batch method. In the continuous method, the crude polyether polyol composition (D1) is continuously passed through a tower of the immobilized solid acid catalyst (B1).

The batch method is preferred as the method of contacting the crude polyether polyol composition (D1) with the Lewis acid (B2) in the presence of water.

The crude polyether polyol composition (D2) obtained by contact of the crude polyether polyol composition (D1) with the solid acid catalyst (B1) in the presence of water essentially has a pH of more than 5.0. The pH is more preferably 5.1 to 6.0.

This is because when the pH is 5.0 or less, it may deactivate an amine catalyst which is used to promote reaction when producing urethane foam by reacting the polyether polyol (F) with the isocyanate.

When the pH of the crude polyether polyol composition (D2) is less than 5, the composition can be neutralized with an alkali or the like, but a step of removing a salt from neutralization is required in this case, which results in prolonged duration of the step.

Step (iii)

In step (1), when the crude polyether polyol composition (D1) is contacted with the solid acid catalyst (B1) by the batch method in the presence of water, the solid acid catalyst (B1) is removed by filtration or the like. Filtration is not essential when the crude polyether polyol composition (D1) is continuously contacted with the solid acid catalyst (B1) by the continuous method.

In the step of recovering the solid acid catalyst (B1) by filtration or the like in the case where the crude polyether polyol composition (D1) is contacted with the solid acid catalyst (B1) by the batch method, the solid acid catalyst (B1) is separated from the crude polyether polyol using a wire mesh or the like. Any equipment may be used as long as it can separate the solid acid catalyst (B1) from the crude polyether polyol.

The batch method is preferred as the method of contacting the crude polyether polyol composition (D1) with the Lewis acid (B2) in the presence of water.

Step (2)

In step (2), the polyether polyol (F) is obtained by removing a volatile component containing the aldehyde (C) in the crude polyether polyol composition (D2). This step is also referred to as a devolatilization step, and removal of a volatile component containing the aldehyde (C) is also referred to as devolatilization.

In view of duration of the step, the temperature in the devolatilization step in the present invention is preferably 90° C. to 130° C., more preferably 100° C. to 110° C.

In view of the water content and the aldehyde content in the polyether polyol (F), the devolatilization time is preferably 30 minutes to 2 hours, more preferably 1 hour to 1 hour and 30 minutes.

Any equipment may be used for the devolatilization step as long as it can devolatilize water and aldehyde without ingress of oxygen.

The polyether polyol (F) obtained by the production method of the present invention is a polyether polyol having a low aldehyde content. The polyether polyol having a low aldehyde content can be used in various applications. The polyurethane foam (G) can be produced by reacting a polyol containing the polyether polyol (F) obtained by the production method of the present invention with the polyisocyanate (E) in the presence of a foaming agent, a catalyst, and a foam stabilizer. The polyurethane foam can have a reduced amount of aldehyde volatilized from the polyurethane foam.

The polyisocyanate (E) may be one conventionally used in polyurethane foam. Examples of such a polyisocyanate include aromatic polyisocyanates, straight-chain or branched aliphatic polyisocyanates, alicyclic polyisocyanates, aromatic-aliphatic polyisocyanates, modified products thereof (e.g., modified products containing a group such as a urethane, carbodiimide, allophanate, urea, biuret, isocyanurate, or oxazolidone group), and mixtures of two or more thereof.

Examples of the aromatic polyisocyanates include C6-C16 (excluding carbon atoms in the NCO group; the same shall apply to the following polyisocyanates) aromatic diisocyanates, C6-C20 aromatic triisocyanates, and crude products of these isocyanates. Specific examples include 1,3- or 1,4-phenylene diisocyanate, 2,4- or 2,6-tolylene diisocyanate (TDI), crude TDI, 2,4'- or 4,4'-diphenylmethane diisocyanate (MDI), polymethylene polyphenylene polyisocyanate (crude MDI), naphthylene-1,5-diisocyanate, and triphenylmethane-4,4',4"-triisocyanate.

Examples of the straight-chain or branched aliphatic polyisocyanates include C6-C10 aliphatic diisocyanates. Specific examples include 1,6-hexamethylene diisocyanate, 2,2,4-trimethylhexamethylene diisocyanate, and lysine diisocyanate.

Examples of the alicyclic polyisocyanates include C6-C16 alicyclic diisocyanates. Specific examples include isophorone diisocyanate, 4,4'-dicyclohexylmethane diisocyanate, 1,4-cyclohexane diisocyanate, and norbornane diisocyanate.

Examples of the aromatic-aliphatic polyisocyanates include C8-C12 aromatic aliphatic diisocyanates. Specific examples include xylylene diisocyanate and α,α,α',α'-tetramethylxylylene diisocyanate.

Specific examples of the modified polyisocyanates include carbodiimide-modified MDI.

Preferred among these in view of reactivity are aromatic polyisocyanates, more preferred are TDI, crude TDI, MDI, crude MDI, and modified products thereof, and particularly preferred are TDI, MDI, and crude MDI.

Examples of the foaming agent include water, liquefied carbon dioxide, and low-boiling compounds having a boiling point of −5° C. to 70° C.

Examples of the low-boiling compounds include hydrogen atom-containing halogenated hydrocarbons and low-boiling hydrocarbons. Specific examples of the hydrogen atom-containing halogenated hydrocarbon and the low-boiling hydrocarbon include methylene chloride, HCFCs (hydrochlorofluorocarbons) (e.g., HCFC-123, HCFC-141b, and HCFC-142b); HFCs (hydrofluorocarbons) (e.g., HFC-134a, HFC-152a, HFC-356mff, HFC-236ea, HFC-245ca, HFC-245fa, and HFC-365mfc); butane; pentane; and cyclopentane.

Preferred among these for use as a foaming agent in view of formability are water, liquefied carbon dioxide, methylene chloride, cyclopentane, HCFC-141b, HFC-134a, HFC-356mff, HFC-236ea, HFC-245ca, HFC-245fa, HFC-365mfc, and mixtures of two or more thereof.

Among these foaming agents, in view of resilience, the water is preferably used in an amount of 1.0 to 8.0 wt %, more preferably 1.5 to 4.0 wt %, based on the weight of the polyol component for use during urethane foam production. In view of forming defect prevention, the low-boiling compound is preferably used in an amount of 30 wt % or less, more preferably 5 to 25 wt %, based on the weight of the polyol component. The liquefied carbon dioxide is preferably used in an amount of 30 wt % or less, more preferably 1 to 25 wt %.

The catalyst may be one that promotes urethane-forming reaction. Examples include tertiary amines (such as triethylenediamine, N-ethylmorpholine, diethylethanolamine, tetramethylethylenediamine, diaminobicyclooctane, 1,2-dimethylimidazole, 1-methylimidazole, 1,8-diazabicyclo-[5,4,0]-undecene-7, bis(N,N-dimethylamino-2-ethyl)ether, and N,N,N',N'-tetramethylhexamethylenediamine), and/or carboxylic acid metal salts (e.g., potassium acetate, potassium octylate, stannous octoate, dibutyl stannic dilaurate, and lead octylate). In view of resilience, the amount of the catalyst is preferably 0.01 to 5.0 wt %, more preferably 0.05 to 2.0 wt %, based on the weight of the polyol component for use during urethane foam production.

The foam stabilizer may be one for use in regular polyurethane foam production. Examples include dimethylsiloxane foam stabilizers (products such as "SRX-253" and "PRX-607" available from Dow Corning Toray Co., Ltd.), and polyether-modified dimethylsiloxane-based foam stabilizers (e.g., "SZ-1142", "SF-2904", "SRX-294A", "SH-193", "SZ-1720", "SZ-1675t", "SF-2936F", and "SF-2904" available from Dow Corning Toray Co., Ltd.; "L-540" and "L-3601" available from Nippon Unicar Company Limited; and "B4900", "B8742LF2", and "B8715LF2" available from EVONIK).

In view of resilience, the amount of the foam stabilizer is preferably 0.3 to 5.0 wt %, more preferably 0.4 to 3.0 wt %, based on the weight of the polyol component.

The method of producing polyurethane foam of the present invention may further use another auxiliary agent (described later), if necessary, for reaction in the presence thereof.

Examples of the other auxiliary agent include known auxiliary components such as colorants (dyes and pigments), plasticizers (e.g., phthalate and adipate), organic fillers (e.g., synthetic short fiber and hollow microspheres made of thermoplastic or thermosetting resin), flame retardants (e.g., phosphate and halogenated phosphate), anti-aging agents (e.g., triazole and benzophenone), and antioxidants (e.g., hindered phenol and hindered amine).

The amounts of these auxiliary agents based on the weight of the polyol component are as follows. The amount of the colorant is preferably 1 wt % or less. The amount of the plasticizer is preferably 10 wt % or less, more preferably 5 wt % or less. The amount of the organic filler is preferably 50 wt % or less, more preferably 30 wt % or less. The amount of the flame retardant is preferably 30 wt % or less, more preferably 2 to 20 wt %. The amount of the anti-aging agent is preferably 1 wt % or less, more preferably 0.01 to 0.5 wt %. The amount of the antioxidant is preferably 1 wt % or less, more preferably 0.01 to 0.5 wt %.

In the production method of the present invention, the isocyanate index (NCO index) (ratio equivalent to (NCO group/active hydrogen atom-containing group)×100) when producing polyurethane foam is preferably 70 to 150, more preferably 75 to 130, particularly preferably 80 to 120, in view of resilience.

An exemplary method of producing polyurethane foam of the present invention is as described below. First, specific amounts of the polyol component for producing polyurethane foam, the foaming agent, the catalyst, the foam stabilizer, and, if necessary, the other auxiliary agent(s) are mixed together. The mixture is then rapidly mixed with an organic polyisocyanate component using a polyurethane foam foaming machine or a stirrer. The resulting mixture (foam stock solution) is continuously foamed, whereby polyurethane foam can be obtained. Alternatively, the resulting mixture is injected into a closed-type or open-type mold (made of metal or resin) for urethane-forming reaction, and after curing for a certain period of time, the resulting product is released from the mold, whereby polyurethane foam can be obtained.

The polyurethane foam of the present invention is used for automobile seat cushions, furniture, bedding pillows, bedding mattresses, clothing, and the like.

EXAMPLES

The present invention is further described below with reference to examples, but the present invention is not

Example 1

An autoclave was charged with 100 parts of a glycerol-PO adduct as an active hydrogen compound (number average molecular weight (Mn) in terms of hydroxyl value: 600) and 2.1 parts of high purity KOH (purity: 96%; sodium content: 200 ppm; hereinafter the same), and the mixture was uniformly dissolved by stirring under reduced pressure at 130° C. The mixture was dehydrated until the water content was 0.1 wt % or less. Subsequently, 628.8 parts of PO was addition-polymerized at a reaction temperature of 95° C., and 181.9 parts of EO was addition-polymerized at a reaction temperature of 130° C.

A crude polyether polyol composition (D0-1) thus obtained was heated and reacted under heating at 130° C. for three hours. The water content when the temperature reached 130° C. was 100 ppm. After cooling to 60° C., alkali adsorption treatment was performed. Specifically, 1.6% of water was added to the crude polyether polyol composition (D0-1) and mixed together at 85° C. to 90° C. for 30 minutes, and 0.5% of "Kyowado 600" (Kyowa Chemical Industry Co., Ltd.) as a treatment agent (adsorbent) was subsequently added to the crude polyether polyol composition (D0-1) and mixed together at the same temperature for 30 minutes, followed by removal of the treatment agent by filtration.

Then, the mixture was dehydrated at 130° C., and 0.1% of "H-BHT" (2,6-di-tert-butyl-P-cresol) (Honshu Chemical Industry Co., Ltd.) as an antioxidant was added to the polyether polyol composition (D0-1) and dissolved at 80° C.

Subsequently, the autoclave was charged with 100 parts of the crude polyether polyol composition (D1-1) obtained by the alkali adsorption treatment, 1 part of a solid catalyst (B1-1) (Tayca Corporation) in which a sulfonic acid group-containing compound as a solid acid catalyst was immobilized on silica, and two parts of water. The mixture was stirred at 90° C. for one hour, whereby a crude polyether polyol composition (D2-1) was obtained. Here, the crude polyether polyol composition (D2-1) had a pH of 5.4.

The solid acid catalyst was removed by filtration using a wire mesh, and the step of removing a volatile component in the autoclave was performed again at a temperature of 110° C. and a pressure of −0.1 MPa or lower for 60 minutes, whereby a polyether polyol (F-1) was obtained.

The resulting polyether polyol having a low aldehyde content (F-1) had a hydroxyl value of 33.9 mg KOH/g, an EO unit content of 20.0 wt %, an unsaturated monool content of 0.038 meq/g, a formaldehyde (C1) content of 0.2 ppm, an acetaldehyde (C2) content of 0.3 ppm, and a propionaldehyde (C3) content of 3.8 ppm.

Example 2

A polyether polyol (F-2) was prepared by obtaining a crude polyether polyol composition (D2-2) as in Example 1, except that 1 part of "Galleon Earth NS" (B1-2) (Mizusawa Industrial Chemicals, Ltd.; activated clay obtained by treating acid clay mainly containing montmorillonite with mineral acid) was used as a solid acid catalyst relative to 100 parts of the crude polyether polyol composition (D1-1) obtained in Example 1. The crude polyether polyol composition (D2-2) had a pH of 5.5.

The resulting polyether polyol having a low aldehyde content (F-2) had a hydroxyl value of 33.7 mg KOH/g, an EO unit content of 20.0 wt %, an unsaturated monool content of 0.039 meq/g, a formaldehyde (C1) content of 0.3 ppm, an acetaldehyde (C2) content of 0.4 ppm, and a propionaldehyde (C3) content of 4.5 ppm.

Example 3

A polyether polyol (F-3) was prepared by obtaining a crude polyether polyol composition (D2-3) as in Example 1, except that 1 part of "Kyowado 700" (B1-3) (Kyowa Chemical Industry Co., Ltd.; a catalyst in which a strong acid $H^+$ is immobilized on synthetic aluminum silicate mainly containing silica and alumina) was used as a solid acid catalyst relative to 100 parts of the crude polyether polyol composition (D1-1) obtained in Example 1. The crude polyether polyol composition (D2-3) had a pH of 5.4.

The resulting polyether polyol having a low aldehyde content (F-3) had a hydroxyl value of 33.6 mg KOH/g, an EO unit content of 20.0 wt %, an unsaturated monool content of 0.041 meq/g, a formaldehyde (C1) content of 0.4 ppm, an acetaldehyde (C2) content of 0.5 ppm, and a propionaldehyde (C3) content of 4.9 ppm.

Example 4

A crude polyether polyol composition (D1-4) was obtained as in Example 1 up to the point before the crude polyether polyol composition was contacted with the solid acid catalyst. The crude polyether polyol composition (D1-1) in Example 1 and the crude polyether polyol composition (D1-4) are the same.

Subsequently, the autoclave was charged with 100 parts of crude polyether polyol composition (D1-4) and 1.2 parts of water, and the mixture was uniformed dissolved by stirring under reduced pressure at 130° C. Then, the solution was passed through a catalyst tower filled with 0.8 parts of a solid acid catalyst "SAC-1" (Tayca Corporation; a catalyst in which a sulfonic acid group-containing compound is immobilized on silica] with a residence time of 180 sec, whereby a crude polyether polyol composition (D2-4) was obtained. Here, the crude polyether polyol composition (D2-4) had a pH of 5.5. Subsequently, the step of removing a volatile component in the autoclave was performed at a temperature of 110° C. and a pressure of −0.1 MPa or lower for 60 minutes, whereby a polyether polyol (F-4) was obtained.

The removal of the solid acid catalyst by filtration using a wire mesh was not performed.

The resulting polyether polyol having a low aldehyde content (F-4) had a hydroxyl value of 33.7 mg KOH/g, an EO unit content of 20.0 wt %, an unsaturated monool content of 0.040 meq/g, a formaldehyde (C1) content of 0.3 ppm, an acetaldehyde (C2) content of 0.3 ppm, and a propionaldehyde (C3) content of 3.4 ppm.

The solid acid catalyst (B1) used in Examples 1 to 4 has a solubility of 0.1 g or less in 100 g of the polyether polyol (A) at 80° C. which is contained in the crude polyether polyol composition (D1) used in each example.

Example 5

A crude polyether polyol composition (D1-5) was obtained as in Example 1 up to the point before the crude polyether polyol composition was contacted with the solid acid catalyst. The crude polyether polyol composition (D1-1) in Example 1 and the crude polyether polyol composition (D1-5) are the same.

A polyether polyol (F-5) was prepared by obtaining the crude polyether polyol composition (D1-5) and a crude polyether polyol composition (D2-5) as in Example 1, except that 100 ppm (0.01 parts) of a tris(pentafluorophenyl) borane (B2-1) was used as a Lewis acid catalyst instead of the solid acid catalyst and that the amount of water to be used relative to 100 parts of the crude polyether polyol composition (D1-5) was changed from 2 parts to 4 parts. The crude polyether polyol composition (D2-5) had a pH of 5.3.

The removal of the solid acid catalyst by filtration using a wire mesh was not performed.

The resulting polyether polyol having a low aldehyde content (F-5) had a hydroxyl value of 33.6 mg KOH/g, an EO unit content of 20.0 wt %, an unsaturated monool content of 0.039 meq/g, a formaldehyde (C1) content of 0.5 ppm, an acetaldehyde (C2) content of 0.4 ppm, and a propionaldehyde (C3) content of 3.5 ppm.

Example 6

A crude polyether polyol composition (D1-6) was obtained as in Example 1 up to the point before the crude polyether polyol composition was contacted with the solid acid catalyst. The crude polyether polyol composition (D1-1) in Example 1 and the crude polyether polyol composition (D1-6) are the same.

A polyether polyol (F-6) was prepared by obtaining the crude polyether polyol composition (D1-6) and a crude polyether polyol composition (D2-6) as in Example 1, except that 300 ppm (0.03 parts) of a tris(pentafluorophenyl) borane (B2-1) was used as a Lewis acid catalyst instead of the solid acid catalyst and that the amount of water to be used relative to 100 parts of the crude polyether polyol composition (D1-6) was changed from 2 parts to 4 parts. The crude polyether polyol composition (D2-6) had a pH of 5.1.

The removal of the solid acid catalyst by filtration using a wire mesh was not performed.

The resulting polyether polyol having a low aldehyde content (F-6) had a hydroxyl value of 33.7 mg KOH/g, an EO unit content of 20.0 wt %, an unsaturated monool content of 0.038 meq/g, a formaldehyde (C1) content of 0.4 ppm, an acetaldehyde (C2) content of 0.2 ppm, and a propionaldehyde (C3) content of 3.1 ppm.

Example 7

A crude polyether polyol composition (D1-7) was obtained as in Example 1 up to the point before the crude polyether polyol composition was contacted with the solid acid catalyst. The crude polyether polyol composition (D1-1) in Example 1 and the crude polyether polyol composition (D1-7) are the same.

A polyether polyol (F-7) was prepared by obtaining the crude polyether polyol composition (D1-7) and a crude polyether polyol composition (D2-7) as in Example 1, except that 500 ppm (0.05 parts) of a tris(pentafluorophenyl) borane (B2-1) was used as a Lewis acid catalyst instead of the solid acid catalyst and that the amount of water to be used relative to 100 parts of the crude polyether polyol composition (D1-7) was changed from 2 parts to 4 parts. The crude polyether polyol composition (D2-7) had a pH of 5.1.

The removal of the solid acid catalyst by filtration using a wire mesh was not performed.

The resulting polyether polyol having a low aldehyde content (F-7) had a hydroxyl value of 33.9 mg KOH/g, an EO unit content of 20.0 wt %, an unsaturated monool content of 0.036 meq/g, a formaldehyde (C1) content of 0.3 ppm, an acetaldehyde (C2) content of 0.2 ppm, and a propionaldehyde (C3) content of 2.8 ppm.

Example 8

A crude polyether polyol composition (D1-8) was obtained as in Example 1 up to the point before the crude polyether polyol composition was contacted with the solid acid catalyst. The crude polyether polyol composition (D1-1) in Example 1 and the crude polyether polyol composition (D1-8) are the same.

A polyether polyol (F-8) was prepared by obtaining the crude polyether polyol composition (D1-8) and a crude polyether polyol composition (D2-8) as in Example 1, except that 100 ppm (0.01 parts) of triphenyl aluminum (B2-2) was used as a Lewis acid catalyst instead of the solid acid catalyst. The crude polyether polyol composition (D2-8) had a pH of 5.2.

The removal of the solid acid catalyst by filtration using a wire mesh was not performed.

The resulting polyether polyol having a low aldehyde content (F-8) had a hydroxyl value of 33.5 mg KOH/g, an EO unit content of 20.0 wt %, an unsaturated monool content of 0.042 meq/g, a formaldehyde (C1) content of 0.5 ppm, an acetaldehyde (C2) content of 0.4 ppm, and a propionaldehyde (C3) content of 4.1 ppm.

Example 9

A crude polyether polyol composition (D1-9) was obtained as in Example 1 up to the point before the crude polyether polyol composition was contacted with the solid acid catalyst. The crude polyether polyol composition (D1-1) in Example 1 and the crude polyether polyol composition (D1-9) are the same.

A polyether polyol (F-9) was prepared by obtaining the crude polyether polyol composition (D1-9) and a crude polyether polyol composition (D2-9) as in Example 1, except that 100 ppm (0.01 parts) of aluminum chloride (B2-3) was used as a Lewis acid catalyst instead of the solid acid catalyst. The crude polyether polyol composition (D2-9) had a pH of 5.3.

The removal of the solid acid catalyst by filtration using a wire mesh was not performed.

The resulting polyether polyol having a low aldehyde content (F-9) had a hydroxyl value of 33.7 mg KOH/g, an EO unit content of 20.0 wt %, an unsaturated monool content of 0.041 meq/g, a formaldehyde (C1) content of 0.5 ppm, an acetaldehyde (C2) content of 0.4 ppm, and a propionaldehyde (C3) content of 3.8 ppm.

The Lewis acid catalyst (B2) used in Examples 5 to 9 had a solubility of more than 0.1 g in 100 g of the polyether polyol (A) at 80° C. which is contained in the crude polyether polyol composition (D1) used in each example.

Comparative Example 1

A crude polyether polyol composition (D1-1) was obtained as in Example 1 up to the point before the crude polyether polyol composition was contacted with the solid acid catalyst.

A comparative polyether polyol (F'-1) was prepared by obtaining a crude polyether polyol composition (D'2-1) as in Example 1, except that 1 wt % (1 part) of phosphoric acid as an acid catalyst and water (2 parts) were used relative to 100 parts of the crude polyether polyol composition (D1-1); neutralizing the phosphoric acid with alkali; and removing a salt from neutralization by filtration using an adsorbent.

The removal of the solid acid catalyst by filtration using a wire mesh was not performed.

The crude polyether polyol composition (D'2-1) had a pH of 3.1.

The resulting comparative polyether polyol (F'-1) had a hydroxyl value of 33.5 mg KOH/g, an EO unit content of 20.0 wt %, an unsaturated monool content of 0.043 meq/g, a formaldehyde (C1) content of 0.7 ppm, an acetaldehyde (C2) content of 1.3 ppm, and a propionaldehyde (C3) content of 54.4 ppm.

Comparative Example 2

A comparative polyether polyol (F'-2) was obtained from a crude polyether polyol composition (D'1-2) and a crude polyether polyol composition (D'2-2) as in Example 1, except that no acid catalyst was used and the removal of the solid acid catalyst by filtration using a wire mesh was not performed.

The resulting comparative polyether polyol (F'-2) had a hydroxyl value of 33.4 mg KOH/g, an EO unit content of 20.0 wt %, an unsaturated monool content of 0.045 meq/g, a formaldehyde (C1) content of 1.4 ppm, an acetaldehyde (C2) content of 4.2 ppm, and a propionaldehyde (C3) content of 417 ppm.

Table 1 shows the polyether polyols having a low aldehyde content (F-1) to (F-9) obtained in Examples 1 to 9, respectively, and the polyether polyols (F'-1) and (F'-2) obtained in Comparative Examples 1 and 2, respectively.

TABLE 1

| | | | Example | | | | | | |
|---|---|---|---|---|---|---|---|---|---|
| | | | 1 | 2 | 3 | 4 | 5 | 6 | 7 |
| | | | | | | Polyether polyol (F) | | | |
| | | | (F-1) | (F-2) | (F-3) | (F-4) | (F-5) | (F-6) | (F-7) |
| Production process | Acid catalyst (B) | Solid acid catalyst (B1) | (B1-1) | (B1-2) | (B1-3) | (B1-1) | — | — | — |
| | | Lewis acid catalyst (B2) | — | — | — | — | (B2-1) | (B2-1) | (B2-1) |
| | | Phosphoric acid | — | — | — | — | — | — | — |
| | | Wt % of (B) based on the weight of (D1) | 1 | 1 | 1 | 0.8 | 0.01 | 0.03 | 0.05 |
| | | pH of (D2) after contact with acid catalyst | 5.4 | 5.5 | 5.4 | 5.5 | 5.3 | 5.1 | 5.1 |
| | | Method of removing acid catalyst (B) | Filtration | Filtration | Filtration | Removal not required | Removal not required | Removal not required | Removal not required |
| Aldehyde content in Polyether polyol (F) | Formaldehyde (C1) content (ppm) | | 0.2 | 0.3 | 0.4 | 0.3 | 0.5 | 0.4 | 0.3 |
| | Acetaldehyde (C2) content (ppm) | | 0.3 | 0.4 | 0.5 | 0.3 | 0.4 | 0.2 | 0.2 |
| | Propionaldehyde (C3) content (ppm) | | 3.8 | 4.5 | 4.9 | 3.4 | 3.5 | 3.1 | 2.8 |

| | | | Example | | Comparative Example | |
|---|---|---|---|---|---|---|
| | | | 8 | 9 | 1 | 2 |
| | | | | Polyether polyol (F) | | |
| | | | (F-8) | (F-9) | (F'-1) | (F'-2) |
| Production process | Acid catalyst (B) | Solid acid catalyst (B1) | — | — | — | — |
| | | Lewis acid catalyst (B2) | (B2-2) | (B2-3) | — | — |
| | | Phosphoric acid | — | — | Phosphoric acid | — |
| | | Wt % of (B) based on the weight of (D1) | 0.01 | 0.01 | 1 | — |
| | | pH of (D2) after contact with acid catalyst | 5.2 | 5.3 | 3.1 | — |
| | | Method of removing acid catalyst (B) | Removal not required | Removal not required | Adsorption and filtration after neutralization of phosphoric acid | Removal not required due to no use of acid catalyst |
| Aldehyde content in Polyether polyol (F) | Formaldehyde (C1) content (ppm) | | 0.5 | 0.5 | 0.7 | 1.4 |
| | Acetaldehyde (C2) content (ppm) | | 0.4 | 0.4 | 1.3 | 4.2 |
| | Propionaldehyde (C3) content (ppm) | | 4.1 | 3.8 | 54.4 | 417 |

Each polyether polyol (F) was analyzed by measuring the hydroxyl value, the unsaturated monool content, and the aldehyde content. Each item was measured as follows.

<Hydroxyl Value>
JIS K1557-1 (2007)
<Unsaturated Monool Content>
JIS K1557-3 (2007)
<Aldehyde Content>
Aldehyde Content (Ppm): HPLC Analysis (1) A sample polyether polyol was diluted with acetonitrile to a concentration of 2.5%.

(2) A 100 mL measuring flask was charged with 50 mg of 2,4-dinitrophenylhydrazine (50% water mixture) (hereinafter referred to as DNPH) and 3 mL of phosphoric acid, and the concentration of the mixture was adjusted with acetonitrile in the flask, whereby a DNPH derivatization reagent was prepared.

(3) Then, 5 mL of the liquid prepared in (1) and 5 mL of the DNPH derivatization reagent prepared in (2) were mixed for reaction at 25° C. for 30 minutes. After 30 minutes of the reaction, the reaction product was diluted with 10 mL of acetonitrile.

(4) The liquid prepared in (3) was analyzed by HPLC. The standard curve was prepared by diluting 6 Aldehydes-DNPH Mixture Standard Solution (FUJIFILM Wako Pure Chemical Corporation) with acetonitrile.

(Measurement Conditions)
HPLC: ACQUITY UPLC H-Class (Waters)
Column: ZORBAX Eclipse XDB-C8, 4.6×250 mm, 5 μm
Developing solution: acetonitrile/water=50/50
Injection amount: 20 μL
Flow rate: 0.8 mL/min Method for Producing Polyurethane Foam A predetermined amount of the polyisocyanate (E) was added to a polyol premix (a mixture of components other than the polyisocyanate (E)) in parts specified in Table 2 to obtain an NCO index of 100. After stirring at 4000 rpm for six seconds using a homodisper (a stirrer available from Tokushu Kika Kogyo Co., Ltd.), the mixture was injected into an aluminum mold (length 300 mm×width 300 mm×height 100 mm) with the temperature adjusted to 65° C., and the mixture was molded by curing time (time from injection of raw materials to release from the mold) of five minutes to obtain foam.

Table 2 shows the aldehyde content measurement results of each foam. Foam samples used to measure the aldehyde content were cut out from the center of the foam.

TABLE 2

| | | Example | | | | | |
|---|---|---|---|---|---|---|---|
| | | 10 | 11 | 12 | 13 | 14 | 15 |
| | | Polyurethane foam (G) | | | | | |
| | | (G-1) | (G-2) | (G-3) | (G-4) | (G-5) | (G-6) |
| Amount in polyol premix (parts by weight) | Polyether polyol having a low aldehyde content (F-1) | 100 | — | — | — | — | — |
| | Polyether polyol having a low aldehyde content (F-2) | — | 100 | — | — | — | — |
| | Polyether polyol having a low aldehyde content (F-3) | — | — | 100 | — | — | — |
| | Polyether polyol having a low aldehyde content (F-4) | — | — | — | 100 | — | — |
| | Polyether polyol having a low aldehyde content (F-5) | — | — | — | — | 100 | — |
| | Polyether polyol having a low aldehyde content (F-6) | — | — | — | — | — | 100 |
| | Polyether polyol having a low aldehyde content (F-7) | — | — | — | — | — | — |
| | Polyether polyol having a low aldehyde content (F-8) | — | — | — | — | — | — |
| | Polyether polyol having a low aldehyde content (F-9) | — | — | — | — | — | — |
| | Comparative polyether polyol (F'-1) | — | — | — | — | — | — |
| | Comparative polyether polyol (F'-2) | — | — | — | — | — | — |
| | Polyol (L-1) | 1.5 | 1.5 | 1.5 | 1.5 | 1.5 | 1.5 |
| | Foaming agent (I-1) | 3.1 | 3.1 | 3.1 | 3.1 | 3.1 | 3.1 |
| | Urethane forming catalyst (J-1) | 1.2 | 1.2 | 1.2 | 1.2 | 1.2 | 1.2 |
| | Urethane forming catalyst (J-2) | 0.06 | 0.06 | 0.06 | 0.06 | 0.06 | 0.06 |
| | Foam stabilizer (K-1) | 0.3 | 0.3 | 0.3 | 0.3 | 0.3 | 0.3 |
| | Foam stabilizer (K-2) | 0.7 | 0.7 | 0.7 | 0.7 | 0.7 | 0.7 |
| | Polyisocyanate (E-1) [NCO index] | 100 | 100 | 100 | 100 | 100 | 100 |
| Matter volatilized from polyurethane foam (G) | Formaldehyde (C1) content (μg/g) | 0.004 | 0.005 | 0.006 | 0.005 | 0.004 | 0.005 |
| | Acetaldehyde (C2) content (μg/g) | 0.006 | 0.006 | 0.006 | 0.006 | 0.006 | 0.005 |
| | Propionaldehyde (C3) content (μg/g) | 0.015 | 0.016 | 0.017 | 0.014 | 0.016 | 0.015 |

| | | Example | | | Comparative Example | |
|---|---|---|---|---|---|---|
| | | 16 | 17 | 18 | 3 | 4 |
| | | Polyurethane foam (G) | | | | |
| | | (G-7) | (G-8) | (G-9) | (G'-1) | (G'-2) |
| Amount in polyol premix (parts by weight) | Polyether polyol having a low aldehyde content (F-1) | — | — | — | — | — |
| | Polyether polyol having a low aldehyde content (F-2) | — | — | — | — | — |
| | Polyether polyol having a low aldehyde content (F-3) | — | — | — | — | — |
| | Polyether polyol having a low aldehyde content (F-4) | — | — | — | — | — |
| | Polyether polyol having a low aldehyde content (F-5) | — | — | — | — | — |
| | Polyether polyol having a low aldehyde content (F-6) | — | — | — | — | — |
| | Polyether polyol having a low aldehyde content (F-7) | 100 | — | — | — | — |
| | Polyether polyol having a low aldehyde content (F-8) | — | 100 | — | — | — |
| | Polyether polyol having a low aldehyde content (F-9) | — | — | 100 | — | — |
| | Comparative polyether polyol (F'-1) | — | — | — | 100 | — |
| | Comparative polyether polyol (F'-2) | — | — | — | — | 100 |
| | Polyol (L-1) | 1.5 | 1.5 | 1.5 | 1.5 | 1.5 |
| | Foaming agent (I-1) | 3.1 | 3.1 | 3.1 | 3.1 | 3.1 |
| | Urethane forming catalyst (J-1) | 1.2 | 1.2 | 1.2 | 1.2 | 1.2 |
| | Urethane forming catalyst (J-2) | 0.06 | 0.06 | 0.06 | 0.06 | 0.06 |
| | Foam stabilizer (K-1) | 0.3 | 0.3 | 0.3 | 0.3 | 0.3 |
| | Foam stabilizer (K-2) | 0.7 | 0.7 | 0.7 | 0.7 | 0.7 |
| | Polyisocyanate (E-1) [NCO index] | 100 | 100 | 100 | 100 | 100 |

TABLE 2-continued

| | | | | | | |
|---|---|---|---|---|---|---|
| Matter volatilized from polyurethane foam (G) | Formaldehyde (C1) content (μg/g) | 0.003 | 0.005 | 0.004 | 0.006 | 0.006 |
| | Acetaldehyde (C2) content (μg/g) | 0.005 | 0.006 | 0.006 | 0.012 | 0.016 |
| | Propionaldehyde (C3) content (μg/g) | 0.013 | 0.019 | 0.018 | 0.020 | 0.027 |

The polyurethane foam raw materials (components in the polyol premix) other than the polyether polyol (F), which were used in Examples 10 to 18 and Comparative Examples 3 and 4, are as follows.

Polyol (L-1): sorbitol-PO.EO adduct; hydroxyl value: 1055; EO content: 27.5%

Foaming agent (I-1): water

Urethane forming catalyst (J-1): "RZETA" available from Tosoh Corporation

Urethane forming catalyst (J-2): "DABCO NE300" available from Air Products and Chemicals, Inc.

Foam stabilizer (K-1): "TEGOSTAB B8742LF2" (Evonik)

Foam stabilizer (K-2): "TEGOSTAB B8715LF2" (Evonik) Polyisocyanate (E-1): TDI-80/crude MDI=80/0 (weight ratio); NCO %=44.6

<Aldehyde Content in Matter Volatilized from Polyurethane Foam>

Aldehyde volatilized from the urethane foam foamed using the polyether polyol having a low aldehyde content or the comparative polyether polyol was collected according to the procedure described in JASO M 903 (2015). The aldehyde content in the collected matter was analyzed by the analysis method of the aldehyde content in the polyether polyol described above.

The amount of aldehyde volatilized from urethane foam is a value per gram of sample.

As is clear from Table 1, the polyether polyols of the production method of the present invention according to Examples 1 to 4 in which a solid acid catalyst was used and according to Examples 5 to 9 in which a Lewis acid catalyst was used each had a pH of more than 5 after the contact with the acid catalyst, and also had a low aldehyde content. In particular, the formaldehyde content and the acetaldehyde content were both 0.5 ppm or lower, so that these polyether polyols are considered to be useful as automotive interior materials.

In contrast, in the case of the polyether polyol of Comparative Example 1 produced using phosphoric acid as an acid catalyst and having a pH of less than 5 in step (1), the crude polyether polyol (D2) had a pH as low as 3.1, so that neutralization with alkali and removal of a salt from neutralization were essential, which resulted in prolonged duration of the step. In addition, the aldehyde content in the polyether polyol (F) was high as compared to Examples 1 to 9.

The polyether polyol of Comparative Example 2 produced without using an acid catalyst had the highest aldehyde content (all the three aldehydes) in the polyether polyol (F), because the production method did not include the step of contacting with an acid catalyst.

As is clear from Table 2, the polyurethane foam of each of Examples 10 to 18 produced with the polyether polyol produced by the production method of the present invention shows that the amount of aldehyde volatilized from the polyurethane foam was low. This effect is presumably due to a low aldehyde content in the polyether polyol (F) used to produce the polyurethane foam.

In contrast, the polyurethane foam of each of Comparative Examples 3 and 4 produced with the polyether polyol obtained in each of Comparative Examples 1 and 2, respectively, shows that the amount of aldehyde volatilized from the polyurethane foam was high, as compared to Examples 10 to 18. This is due to a high aldehyde content in the polyether polyol (F') used to produce the polyurethane foam.

Thus, reducing the aldehyde content in a polyether polyol can reduce the amount of aldehyde volatilized from polyurethane foam produced using the polyether polyol as a raw material.

INDUSTRIAL APPLICABILITY

The polyether polyol having a low aldehyde content obtainable by the production method of the present invention has a low aldehyde content as compared to those obtainable by the conventional methods. Thus, soft polyurethane foam having a reduced amount of aldehyde volatilization can be obtained.

Due to the effect described above, the polyether polyol having a low aldehyde content obtainable by the present invention is applicable as a raw material of vehicle seat cushions and the like.

The invention claimed is:

1. A method of producing a polyether polyol (F), comprising:
    step (1) of obtaining a crude polyether polyol composition (D2) having a pH higher than 5.0 by contact of a crude polyether polyol composition (D1) containing a polyether polyol (A) with an acid catalyst (B) in the presence of water, the polyether polyol (A) being obtainable by ring-opening polymerization of an alkylene oxide with an active hydrogen compound; and
    step (2) of removing a volatile component containing an aldehyde (C) after step (1),
    wherein the acid catalyst (B) is either a solid acid catalyst (B1) or a Lewis acid catalyst (B2),
        wherein the solid acid catalyst (B1) has a solubility of 0.1 g or less in 100 g of the polyether polyol (A) at 80° C., and
        wherein the Lewis acid catalyst (B2) has a solubility of more than 0.1 g in 100 g of the polyether polyol (A) at 80° C.

2. The production method according to claim 1,
    wherein the aldehyde (C) is acetaldehyde (C2), and the amount of acetaldehyde (C2) in the polyether polyol (F) is 0.3 to 0.5 ppm.

3. The production method according to claim 1,
    wherein the crude polyether polyol composition (D1) is contacted with the acid catalyst (B) at a temperature of 25° C. to 150° C.

4. The production method according to claim 1,
    wherein the amount of water is 0.05 to 5.0 wt % based on the weight of the crude polyether polyol composition (D1).

5. The production method according to claim 1,
    wherein the acid catalyst (B) is the solid acid catalyst (B1) having a solubility of 0.1 g or less in 100 g of the polyether polyol (A) at 80° C.

6. The production method according to claim 5,
wherein the solid acid catalyst (B1) is a solid acid catalyst in which an acid (b) is immobilized on at least one solid selected from the group consisting of silica, alumina, titania, magnesia, zirconia, zeolite, montmorillonite, aluminum silicate, hydroxyapatite, and mixtures thereof.

7. The production method according to claim 5,
wherein the solid acid catalyst (B1) is a solid acid catalyst in which a sulfonic acid group-containing compound is immobilized on silica.

8. The production method according to claim 5,
wherein the crude polyether polyol composition (D1) is contacted with the solid acid catalyst (B1) by a batch method.

9. The production method according to claim 5,
wherein the crude polyether polyol composition (D1) is continuously contacted with the immobilized solid acid catalyst (B1).

10. The production method according to claim 5,
wherein the amount of the solid acid catalyst (B1) is 0.01 to 5.0 wt % based on the weight of the crude polyether polyol composition (D1).

11. The production method according to claim 1,
wherein the acid catalyst (B) is the Lewis acid catalyst (B2) having a solubility of more than 0.1 g in 100 g of the polyether polyol (A) at 80° C.

12. The production method according to claim 11,
wherein the Lewis acid catalyst (B2) is at least one compound selected from the group consisting of triphenylborane, triphenyl aluminum, tris(pentafluorophenyl)borane, and tris(pentafluorophenyl)aluminum.

13. The production method according to claim 11,
wherein the amount of the Lewis acid catalyst (B2) is 30 to 1000 ppm based on the weight of the crude polyether polyol composition (D1).

14. The production method according to claim 1,
wherein the crude polyether polyol composition (D1) is a crude polyether polyol composition obtained by removing, from a crude polyether polyol composition (D0) obtained by ring-opening polymerization of an alkylene oxide with an active hydrogen compound in the presence of an alkaline catalyst, the alkaline catalyst in the crude polyether polyol composition (D0), through adsorption with a treatment agent.

* * * * *